(12) United States Patent
Matsumoto et al.

(10) Patent No.: US 10,211,615 B2
(45) Date of Patent: Feb. 19, 2019

(54) ELECTRICAL CONNECTOR ASSEMBLY HAVING A WATERPROOFING PROVISION WITHOUT A SEAL RING

(71) Applicants: Tyco Electronics Japan G.K., Kanagawa (JP); Toyota Jidosha Kabushiki Kaisha, Aichi-ken (JP)

(72) Inventors: Tsugumi Matsumoto, Kanagawa (JP); Ryuichi Komiyama, Kanagawa (JP); Tomoyuki Funayama, Aichi-ken (JP)

(73) Assignees: Tyco Electronics Japan G.K., Kanagawa (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 15/631,619

(22) Filed: Jun. 23, 2017

(65) Prior Publication Data

US 2017/0373481 A1    Dec. 28, 2017

(30) Foreign Application Priority Data

Jun. 24, 2016    (JP) .................................. 2016-125747

(51) Int. Cl.
*H01R 13/62* (2006.01)
*H02G 3/08* (2006.01)
(Continued)

(52) U.S. Cl.
CPC ......... *H02G 3/088* (2013.01); *H01R 13/5213* (2013.01); *H01R 13/5221* (2013.01);
(Continued)

(58) Field of Classification Search
CPC ................ H01R 13/633; H01R 13/635; H01R 13/62933; H01R 13/6271; H01R 13/6275;
(Continued)

(56) References Cited

U.S. PATENT DOCUMENTS 5,382,174 A    1/1995   Kinoshita
5,954,532 A *  9/1999   Matsuura ......... H01R 13/62933
                                                    439/372
(Continued)

FOREIGN PATENT DOCUMENTS

EP    0790671 A2    8/1997
JP    2005108499 A  4/2005
(Continued)

OTHER PUBLICATIONS

Abstract of JP2014229489, dated Dec. 8, 2014, 1 page.
(Continued)

*Primary Examiner* — Chandrika Prasad
(74) *Attorney, Agent, or Firm* — Barley Snyder

(57) ABSTRACT

An electrical connector assembly comprises a first connector and a second connector. The first connector has a hood defining a mating opening. The second connector has a housing body configured to be received in the hood, a rear end wall formed continuous with the housing body and projecting outward from the housing body in a circumferential direction, a lock arm configured to prevent disengagement of the first connector and the second connector, and a cover disposed at the rear end wall covering a portion of the lock arm. A front end surface of the rear end wall facing the second connector forms a uniformly continuous flat surface in a region including the cover.

11 Claims, 6 Drawing Sheets

(51) Int. Cl.
*H01R 13/629* (2006.01)
*H01R 13/52* (2006.01)
*H01R 13/627* (2006.01)
*H01R 13/639* (2006.01)
*H02G 3/10* (2006.01)

(52) U.S. Cl.
CPC ..... *H01R 13/5227* (2013.01); *H01R 13/6272* (2013.01); *H01R 13/62933* (2013.01); *H01R 13/6395* (2013.01); *H02G 3/105* (2013.01)

(58) Field of Classification Search
CPC ............ H01R 13/6272; H01R 13/5213; H01R 13/5221; H01R 13/5227
USPC .......................... 439/153, 157, 352, 357, 358
See application file for complete search history.

(56) References Cited

U.S. PATENT DOCUMENTS

| | | | | |
|---|---|---|---|---|
| 5,967,857 | A * | 10/1999 | Okabe | H01R 13/506 439/542 |
| 6,045,384 | A * | 4/2000 | Norizuki | H01R 13/62933 439/157 |
| 6,213,793 | B1 * | 4/2001 | Norizuki | H01R 13/62933 439/157 |
| 6,890,204 | B2 * | 5/2005 | Yamawaki | H01R 13/6272 439/350 |
| 7,367,835 | B2 * | 5/2008 | Takahashi | H01R 13/6272 439/354 |
| 2002/0025711 | A1 * | 2/2002 | Kashiyama | H01R 13/641 439/352 |
| 2003/0045153 | A1 * | 3/2003 | Yamawaki | H01R 13/6272 439/352 |
| 2006/0035520 | A1 * | 2/2006 | Huang | H01R 13/6582 439/346 |
| 2007/0155209 | A1 * | 7/2007 | Takahashi | H01R 13/6272 439/157 |

FOREIGN PATENT DOCUMENTS

| | | |
|---|---|---|
| JP | 2007220557 A | 8/2007 |
| JP | 20084381 A | 1/2008 |
| JP | 2011150895 A | 8/2011 |
| JP | 2014229489 A | 12/2014 |
| WO | 2014079978 A1 | 5/2014 |

OTHER PUBLICATIONS

Abstract of JP2011150895, dated Aug. 4, 2011, 1 page.
European search report, dated Aug. 25, 2017, 12 pages.
Japanese Notice of Reasons for Refusal and English translation, dated Sep. 5, 2017, 6 pages.
Abstract of JP2008004381, dated Jan. 10, 2008, 1 page.

* cited by examiner

ELECTRICAL CONNECTOR ASSEMBLY HAVING A WATERPROOFING PROVISION WITHOUT A SEAL RING

CROSS-REFERENCE TO RELATED APPLICATION

This application claims the benefit of the filing date under 35 U.S.C. § 119(a)-(d) of Japanese Patent Application No. 2016-125747, filed on Jun. 24, 2016.

FIELD OF THE INVENTION

The present invention relates to an electrical connector assembly and, more particularly, to a partially waterproof electrical connector assembly.

BACKGROUND

In known electrical connectors used in applications in which the connector is exposed to water, the water generally falls onto an upper part of the connector in the vertical direction. The water received on the upper part of the electrical connector is known to enter the gap between a hood and the connector. In the known electrical connector, a rubber seal ring that is separate from a housing is interposed between, for example, a male housing and a female housing to prevent water from entering the electrical connector. In addition to the seal ring, some known housings have an inclined surface so as to discharge water that has entered the connector.

Japanese Patent Application No. 2011-150895A, for example, discloses an inclined surface on an inner surface of a case so that water entering a gap between the case and the connector can flow toward an opening side. JP 2011-150895A discloses that a groove extending toward the opening is formed in the inclined surface and drainage is improved due to capillary action caused by the groove. The inclined surface disclosed in JP 2011-150895A is provided between a hood of the case and the connector so as to discharge the water entering the connector, however, the inclined surface cannot prevent the water from entering the connector. The structure disclosed in JP 2011-150895A includes a seal ring, which allows water to enter until the water reaches the area of the seal ring.

The seal ring, although affording waterproof protection to the connector, is nonetheless an additional member required in the assembly of the connector. Accordingly, if the electrical connector is used in an application in which water penetration is unlikely, there is no need to provide a seal ring and it is sufficient to ensure a partial or light waterproof performance.

SUMMARY

An electrical connector assembly according to the invention comprises a first connector and a second connector. The first connector has a hood defining a mating opening. The second connector has a housing body configured to be received in the hood, a rear end wall formed continuous with the housing body and projecting outward from the housing body in a circumferential direction, a lock arm configured to prevent disengagement of the first connector and the second connector, and a cover disposed at the rear end wall covering a portion of the lock arm. A front end surface of the rear end wall facing the second connector forms a uniformly continuous flat surface in a region including the cover.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
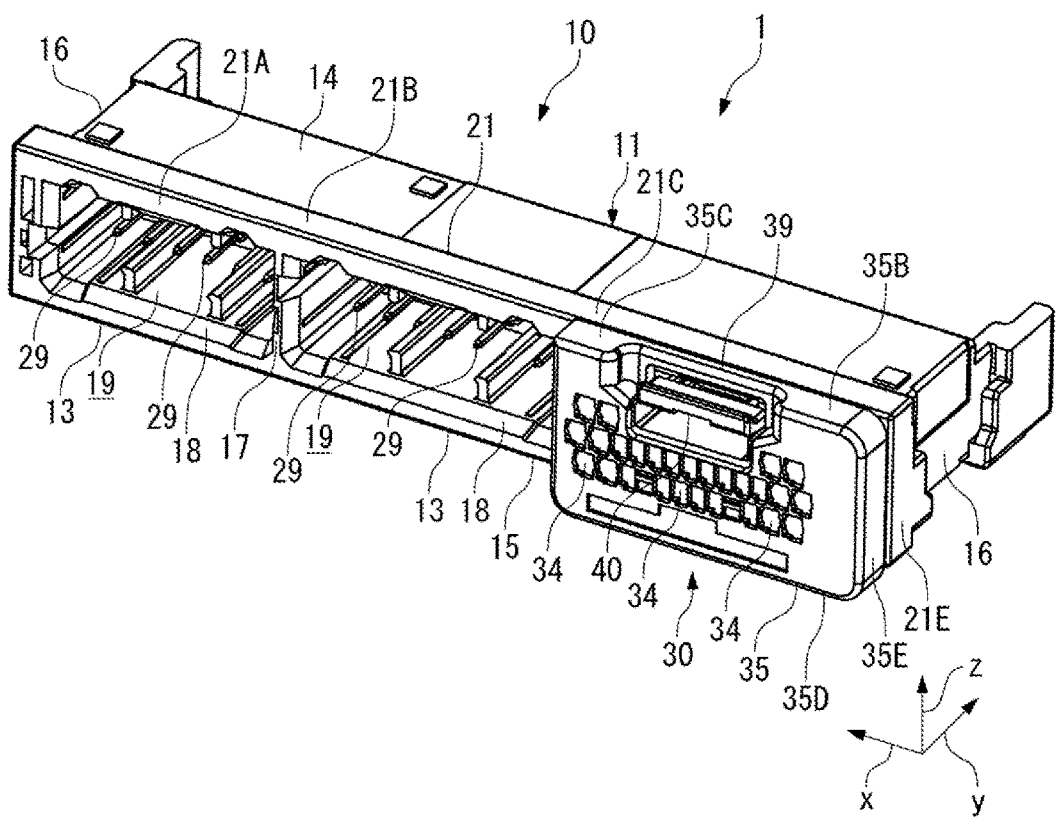
FIG. 1 is a perspective view of an electrical connector assembly according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 2:
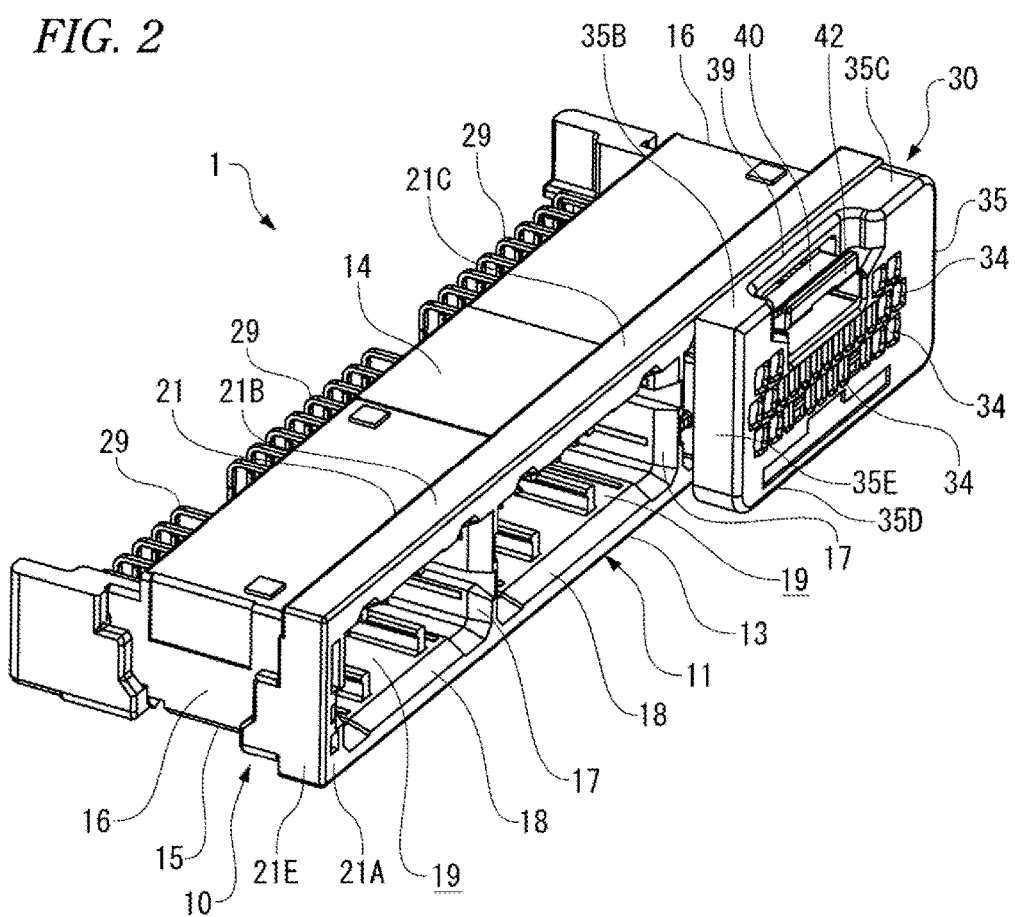
FIG. 2 is another perspective view of the electrical connector assembly of FIG. 1.
Figure 3:
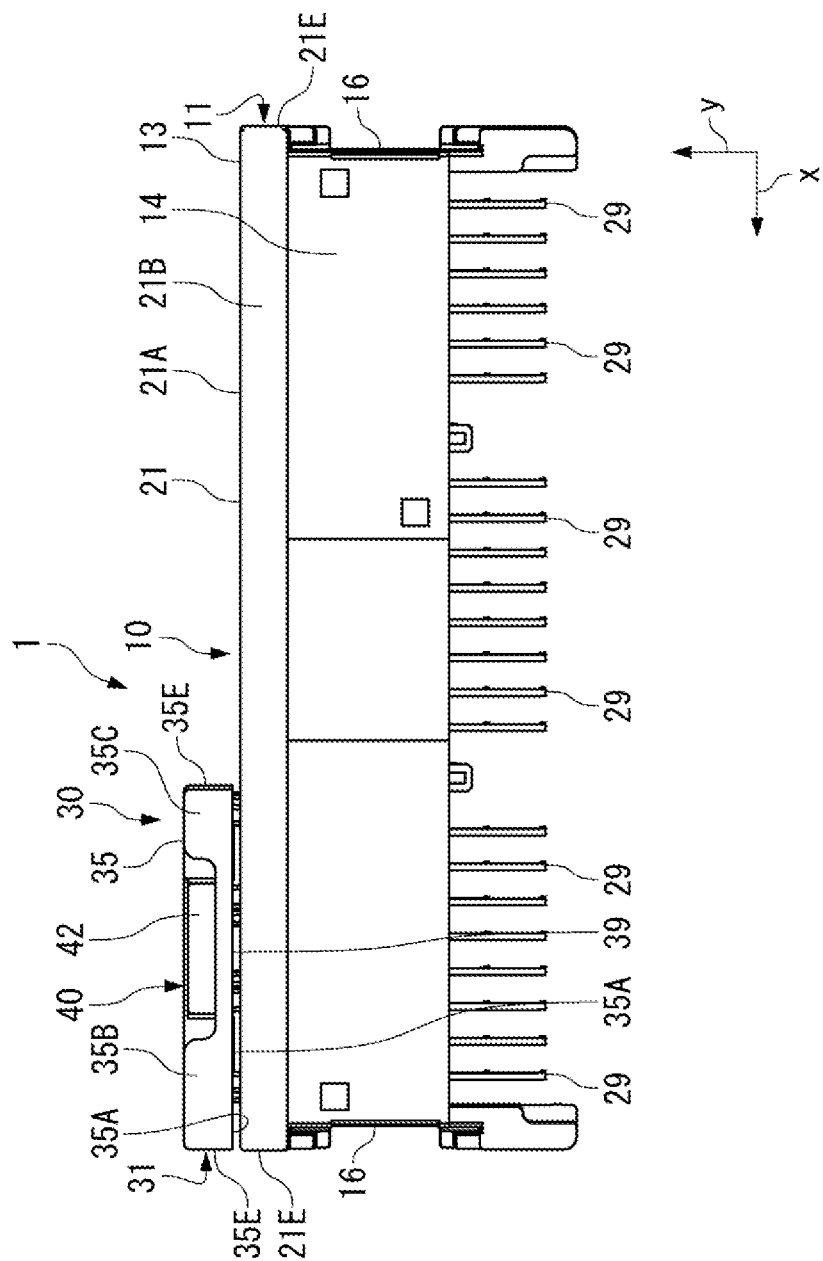
FIG. 3 is a plan view of the electrical connector assembly of FIG. 1.

An electrical connector assembly 1 according to the invention is shown in FIGS. 1-3. The electrical connector assembly 1 includes a first connector 10 and a second connector 30. The second connector 30 is matable with the first connector 10. In the shown embodiment, the first connector 10 is a female connector that is configured to be fixed to, for example, a printed wiring board and second connector 30 is a male connector. In the shown embodiment, the first connector 10 has a structure in which three male second connectors 30 are aligned and mated with the female first connector 10; only one second connector 30 is shown in FIGS. 1-3.

A side at which the first connector 10 and the second connector 30 are mated together is defined as a front side of each connector 10, 30, and a side opposite to the front side is defined as a rear side. A side of the electrical connector assembly 1 that is fixed to the printed wiring board and faces the printed wiring board is defined as a lower side, and a side of the electrical connector assembly 1 that is opposite to the lower side is defined as an upper side. The major components of the invention will now be described in greater detail.

The first connector 10, as shown in FIGS. 1-3, includes a first housing 11 and a plurality of first contacts 29. In the shown embodiment, the first housing 11 is a female housing and the first contacts 29 are male contacts. The first housing 11 is integrally formed of electrically insulative material. The first contacts 29 are formed of a material having high conductivity, such as a copper-based material. The first housing 11 holds the first contacts 29 in a state in which the contacts 29 are arranged at intervals.

The first housing 11, as shown in FIGS. 1-3, has a hood 13 configured to be mated with the second connector 30. The hood 13 has a rectangular tubular shape defining a mating opening 18. The hood 13 includes a plurality of receiving spaces 19 for receiving the male connectors 30. In the shown embodiment, the hood 13 is partitioned into three hoods 13 by partition walls 17, and the male connectors 30 are mated with the receiving spaces 19 respectively corresponding to the three hoods 13.

As shown in FIGS. 1-3, one part of each of the first contacts 29 that is configured to be electrically connected to a contact of the second connector 30 extends into the corresponding receiving space 19 and another part of each of the first contacts 29 that is configured to be connected to the printed wiring board (not shown) extends rearward of the hood 13. The part of each of the first contacts 29 extending rearward, as shown in FIGS. 2 and 3, is bent by 90 degrees in the middle of the contact 29. The first contacts 29 are arranged in a plurality of columns in a width direction x and are also arranged in a plurality of rows in a height direction z.

The hood 13 includes an upper wall 14, a lower wall 15, and a pair of side walls 16 as shown in FIGS. 1-3. The upper wall 14 and the lower wall 15 extend in the width direction x and are opposed to each other at a predetermined distance. The pair of side walls 16 connects both ends of each of the upper wall 14 and the lower wall 15 in the height direction z. In the hood 13, the above-mentioned partition walls 17 connect the upper wall 14 and the lower wall 15 to each other in the height direction z at positions where the hood 13 is partitioned into three hoods 13 in the width direction x.

Figure 4A:
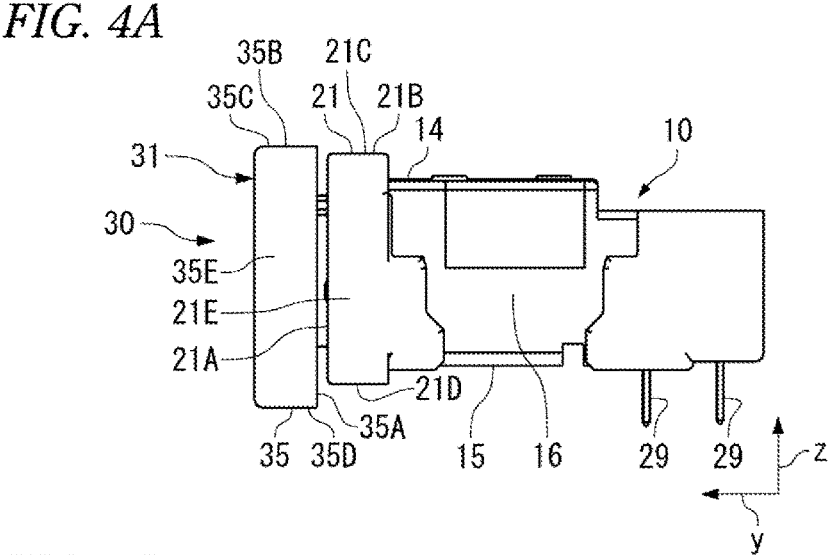
FIG. 4A is a side view of the electrical connector assembly of FIG. 1.
Figure 4B:
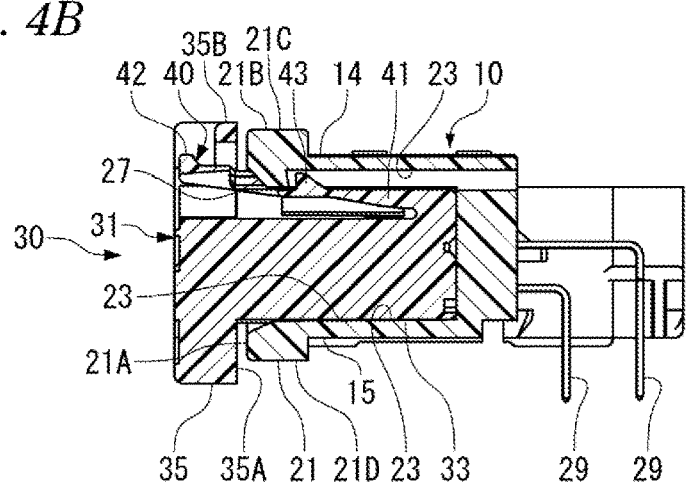
FIG. 4B is a sectional view of FIG. 4A.

A frame 21 as shown in FIGS. 1-3 is disposed at a front end of the hood 13. The frame 21 is provided so as to project outward in a circumferential direction in a flange shape from each of the upper wall 14, the lower wall 15, and the pair of side walls 16, and surrounds the mating opening 18. A front end surface 21A of the frame 21 forms a uniformly continuous flat surface. An outer peripheral surface 21B of the frame 21 forms a uniformly continuous flat surface and includes four surfaces respectively corresponding to the upper wall 14, the lower wall 15, and the pair of side walls 16. The four surfaces include a top surface 21C corresponding to the upper wall 14, a bottom surface 21D corresponding to the lower wall 15, and side surfaces 21E corresponding to the side walls 16. As shown in FIG. 4B, the frame 21 has a first lock projection 27 disposed on an inner peripheral surface facing the receiving space 19 and the mating opening 18.

The second connector 30 is shown in FIGS. 4A-4C and FIGS. 5A-5C. The second connector 30 includes a second housing 31 and a plurality of second contacts (not shown) held in the second housing 31. The second housing 31 holds a number of second contacts corresponding to the number of the first contacts 29 at the positions respectively corresponding to the positions of the first contacts 29. The materials of the second housing 31 and the second contacts are the same as those of the first housing 11 and first contacts 29 of the first connector 10.

Figure 5A:
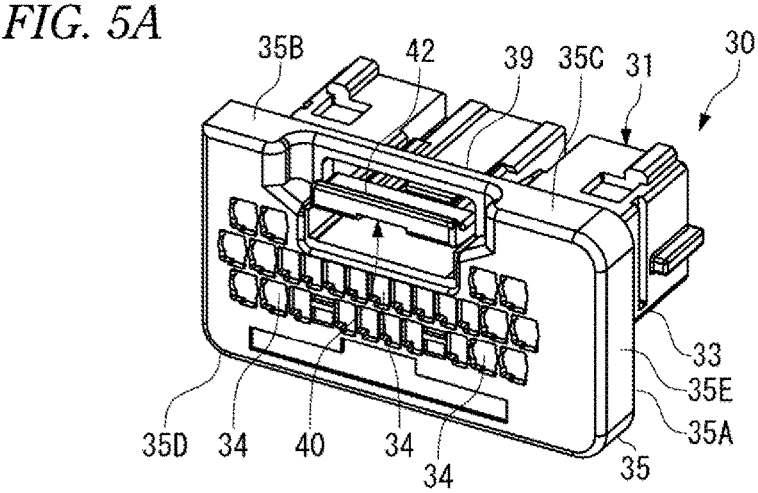
FIG. 5A is a perspective view of a second connector of the electrical connector assembly of FIG. 1.
Figure 5B:
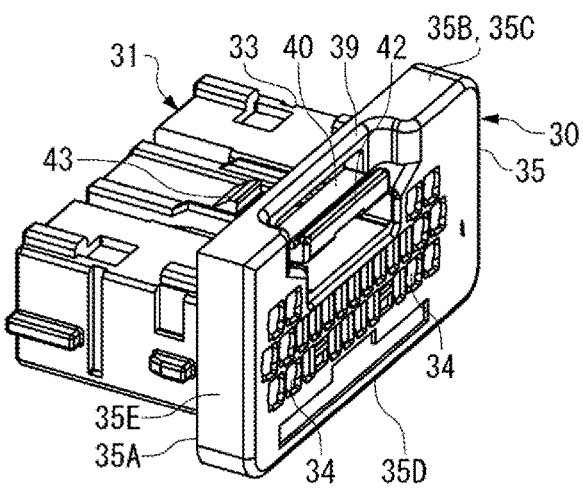
FIG. 5B is another perspective view of the second connector of FIG. 5A.
Figure 5C:
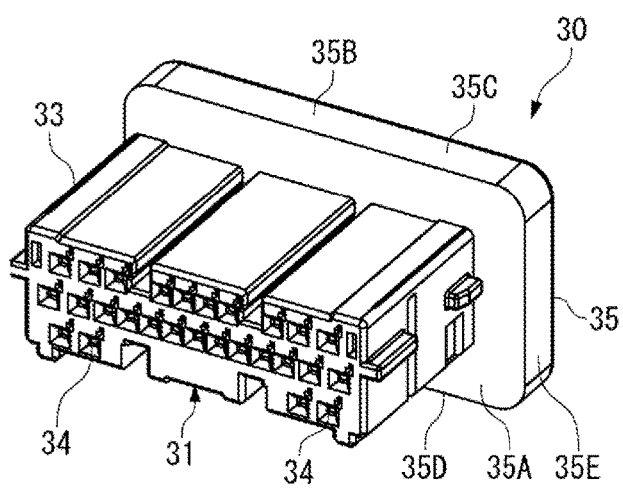
FIG. 5C is another perspective view of the second connector of FIG. 5A.

The second housing 31, as shown in FIGS. 5A-5C, includes a housing body 33 that holds the second contacts. A rear end wall 35 of the second housing 31 is continuous with a rear end of the housing body 33. A plurality of contact receiving holes 34 is formed along one direction of the housing body 33. The second contacts (not shown) are inserted into the respective contact receiving holes 34. The contact receiving holes 34 penetrate the rear end wall 35.

The rear end wall 35, as shown in FIGS. 5A-5C, projects outward in the circumferential direction in a flange shape from the housing body 33 and a front end surface 35A of the rear end wall 35 forms a uniformly continuous flat surface. An outer peripheral surface 35B of the rear end wall 35 forms a uniformly continuous flat surface. The outer peripheral surface 35B includes a top surface 35C corresponding to the top surface 21C, a bottom surface 35D corresponding to the bottom surface 21D, and side surfaces 35E corresponding to the side surfaces 21E.

A lock arm 40 is disposed at a central part in the width direction on an upper surface of the housing body 33 as shown in FIGS. 5A-5C. A front end side of the lock arm 40 forms a support end 41 that is fixed to the housing body 33 and a rear end side of the lock arm 40 forms an operation end 42. The lock arm 40 includes a second lock projection 43 formed between the support end 41 and the operation end 42.

As shown in FIGS. 5A-5C, the housing body 33 includes a cover 39 that covers the lock arm 40 from above. A recess penetrating the rear end wall 35 is formed in a part of the rear end wall 35 and thus the cover 39 is provided as a component of the rear end wall 35. An upper surface of the cover 39 is flush with the top surface 35C of the rear end wall 35. Further, a front end surface of the cover 39 is flush with the front end surface 35A of the rear end wall 35. The front end surface 35A of the rear end wall 35, including the part corresponding to the cover 39, is formed as a flat surface. The recess is formed below the cover 39, and the rear end part including the operation end 42 of the lock arm 40 penetrates the recess and projects rearward of the cover 39. The lock arm 40 is pivotable about the support end 41 within the range of the recess. The thickness of the cover 39 in a mating direction y is set to be smaller than the thickness of the other part of the rear end wall 35, thereby securing the operation on the operation end 42 of the lock arm 40.

The second connector 30 is inserted into one receiving space 19 of the first connector 10 to mate with the first connector 10 and the first contacts 29 contact the second contacts (not shown). In the process of mating the second connector 30 with the first connector 10, the second lock projection 43 of the second connector 30 climbs over and engages the first lock projection 27 of the first connector 10, thereby preventing the first connector 10 and the second connector 30 from being disengaged from each other as shown in FIG. 4B. When the first connector 10 and the second connector 30 are mated together, the cover 39 covers the lock arm 40, thereby preventing erroneous operation of the lock arm 40. In order to release the locked state of the first lock projection 27 and the second lock projection 43, the operation end 42 of the lock arm 40 is pressed downward in FIG. 4B. In this state, when the second connector 30 is pulled from the first connector 10, the mated state of the first connector 10 and the second connector 30 is released.

Figure 6A:
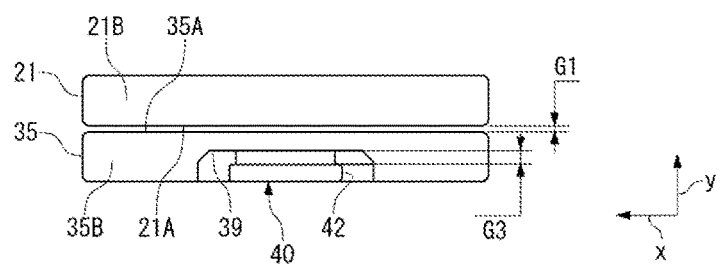
FIG. 6A is a plan view of a first connector and the second connector of the electrical connector assembly of FIG. 1.
Figure 6B:
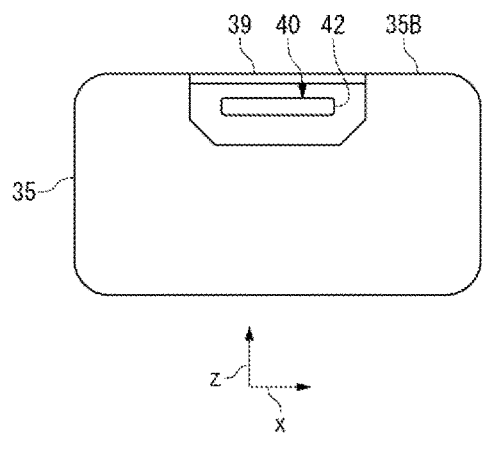
FIG. 6B is a front view of the first connector and the second connector of FIG. 6A.
Figure 6C:
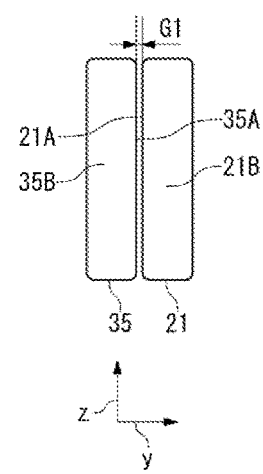
FIG. 6C is a side view of the first connector and the second connector of FIG. 6A.

As shown in FIGS. 1-3, in a state in which the first connector 10 and the second connector 30 are mated together, the rear end wall 35 is disposed outside the hood 13. The front end surface 35A of the rear end wall 35 and the front end surface 21A of the frame 21 face each other and are parallel to and in proximity to each other with a small gap G1 interposed therebetween, as shown in FIGS. 6A-6C. The small gap G1 is uniform on the circumference of the outer peripheral surface 21B and the outer peripheral surface 35B, i.e., between the top surface 21C and the top surface 35C, between the bottom surface 21D and the bottom surface 35D, and between the side surfaces 21E and the side surfaces 35E. The portion of the front end surface 35A including the cover 39 is parallel to the front end surface 21A of the frame 21 so as not to form irregularities.

Even when water falls onto a boundary between the front end surface 21A and the front end surface 35A, since the front end surface 21A and the front end surface 35A are parallel to each other with the small gap G1 interposed therebetween, including the region in which the cover 39 is provided, the water is less likely to enter the gap G1 therebetween. Further, since the gap G1 is narrow, even when water falls onto the gap G1, the water flows in the width direction x along the gap G1 between the front end surface 21A and the front end surface 35A due to the capillary action. When the water reaches the both ends in the width direction x, the water then flows downward in the height direction z through the gap G1 between the rear end wall 35 and the frame 21. Thus, even when the water enters the gap G1, the water is accumulated in the gap G1 between the front end surface 21A and the front end surface 35A, or is discharged downward from the gap G1, so that the water is less likely to enter the hood 13.

Figure 4C:
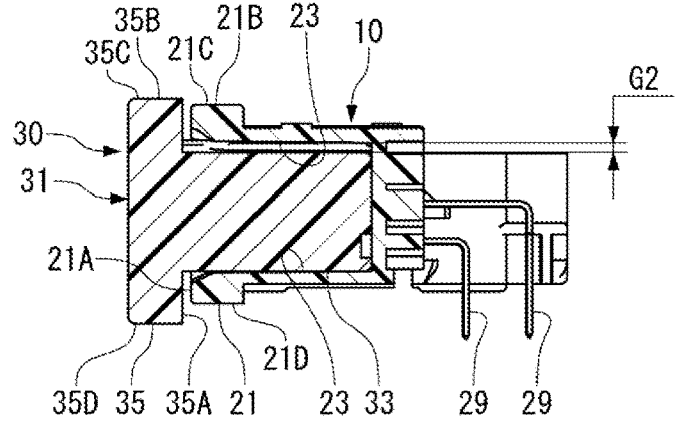
FIG. 4C is another sectional view of FIG. 4A.

When the gap G1 is narrower than a gap G2, the gap G2 formed in a direction Z, between the hood 13 and the housing body 33, shown in FIG. 4C, the water can be prevented from entering the gap G2 between the hood 13 and the housing body 33, even when the water enters the gap G1 between the front end surface 21A and the front end surface 35A. In order to cause the capillary action between the rear end wall 35 and the frame 21, in an embodiment, the gap G1 is 3 mm or less, and may be 1.25 mm or less or approximately 1.0 mm so as to allow water droplets to cross the gap G1 therebetween. In an embodiment, the gap G1 is smaller than a distance G3 from the cover 39 to the operation end 42 of the lock arm 40 shown in FIG. 6A; water is thus accumulated in the gap G1 between the front end surface 35A and the front end surface 21A due to the capillary action and surface tension, and is less likely to enter the lock part.

In other embodiments, only a gap G1 formed between the top surface 21C and the top surface 35C in the upper part of the connector assembly 1 is narrow and parallel as opposed to the gap G1 between all surfaces of the front end surface 35A and the front end surface 21A in the shown embodiment. Further, in other embodiments, the first connector 10 may have a different number of partitioned hoods 13. The shapes and dimensions of the first connector 10 and the second connector 30 may also vary.

What is claimed is:

1. An electrical connector assembly, comprising:
    a first connector having a hood defining a mating opening; and
        a frame surrounding the mating opening and projecting outward from the hood in a circumferential direction; and
    a second connector having
        a housing body configured to be received in the hood,
        a rear end wall formed continuous with the housing body and projecting outward from the housing body in a circumferential direction,
        a lock arm configured to prevent disengagement of the first connector and the second connector, and
        a cover disposed at the rear end wall and covering a portion of the lock arm, a front end surface of the rear end wall facing a front end surface of the frame and the first connector forming a uniformly continuous flat surface in a region including the cover; and
        a first gap disposed between the front end surface of the rear end wall and the front end surface of the frame, being less than or equal to 1.25 mm;
    wherein, in a mated state of the first connector and the second connector, the front end surface of the rear end wall is parallel to the front end surface of the frame.

2. The electrical connector assembly of claim 1, wherein the first gap is narrower than a second gap disposed between an outer surface of the housing body and an inner surface of the hood.

3. The electrical connector assembly of claim 1, wherein the first gap is smaller than a distance from a rear end surface of the cover to a front end surface of an operation end of the lock arm.

4. The electrical connector assembly of claim 1, wherein the frame has a first lock projection disposed on an inner peripheral surface facing the mating opening.

5. The electrical connector assembly of claim 4, wherein the lock arm has a support end fixed to the housing body and an opposite operation end.

6. The electrical connector assembly of claim 5, wherein the lock arm has a second lock projection disposed between the support end and the operation end.

7. The electrical connector assembly of claim 6, wherein the second lock projection engages the first lock projection when the first connector is locked to the second connector.

8. The electrical connector assembly of claim 6, wherein the rear end wall has a recess disposed adjacent the cover.

9. The electrical connector assembly of claim 8, wherein the operation end extends through the recess and projects rearward of the cover.

10. The electrical connector assembly of claim 6, wherein the lock arm is pivotable about the support end.

11. The electrical connector assembly of claim 1, wherein a thickness of the cover in a mating direction is smaller than a thickness of other portions of the rear end wall.

* * * * *